A. W. Harris.
Suspenders.
No. 3615. Reissued Aug. 24. 1869.
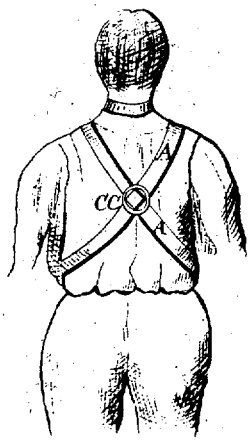
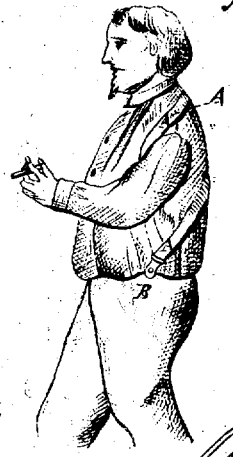
Fig. 4.
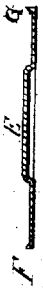
Fig. 3.
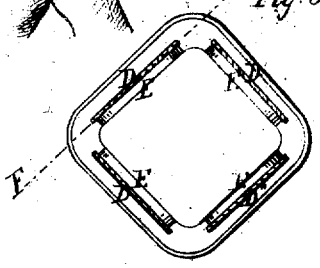
Fig. 1.
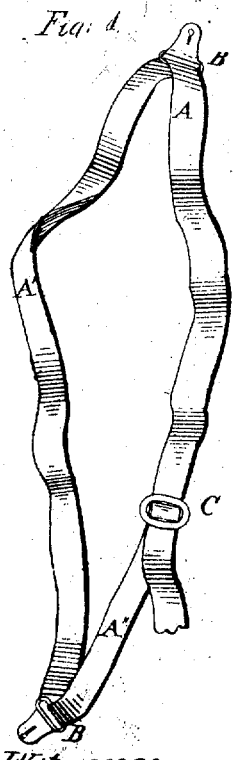
Fig. 2.
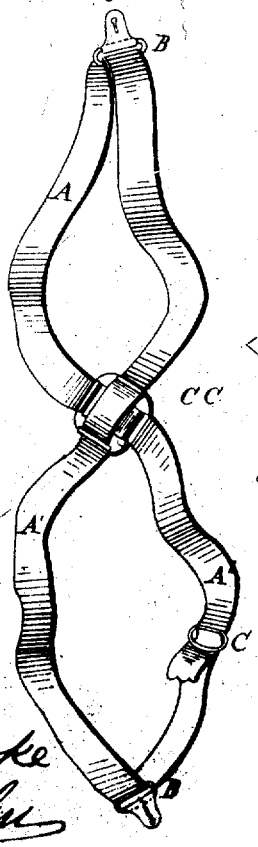
Fig. 5.
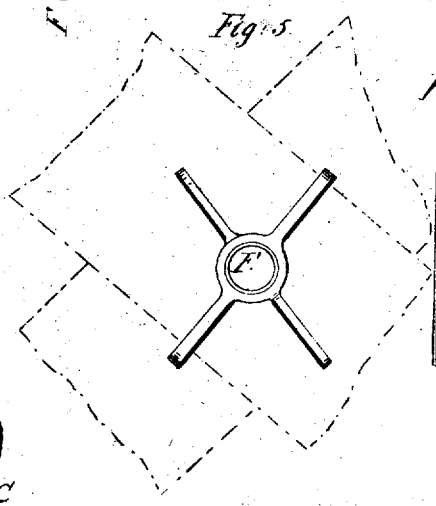
Fig. 6
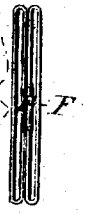
Witnesses:
John J. Pembroke
Louis Globsohn
Inventor:
Alex. W. Harris

UNITED STATES PATENT OFFICE.

ALEXANDER W. HARRIS, OF NEW YORK, N. Y.

IMPROVEMENT IN SUSPENDERS.

Specification forming part of Letters Patent No. 78,872, dated June 16, 1868; Reissue No. 3,615, dated August 24, 1869.

*To all whom it may concern:*

Be it known that I, ALEXANDER WIMBISH HARRIS, of New York city, county and State of New York, United States of America, have invented a new and Improved Adjustable Suspender and Brace; and I do hereby declare that the following is a full, clear, and exact description thereof, which will enable others skilled in the art to make use of the same.

The drawings represent my invention as follows:

Figure 1, A is a straight piece of webbing, which, being passed through the loops B B and joined at the end, by the appliance of a slide, buckle, or other device, as shown at C, forms an adjustable suspender, as shown in Fig. 1, which can be crossed in putting it on, at the pleasure of the wearer. Fig. 2 shows the suspender crossed and held in proper adjustment by the slide C C, the object of which is to secure an adjustable crossing in the proper place, at the pleasure of the wearer, and which can be taken off or worn at convenience. Fig 3 represents the accommodation-slide C C, which can be formed of metal, leather, cloth, or any suitable material. It is provided with four slots, D D D D, for the purpose of passing the webbing through, after which the webbing is held in place by the four raised lips, E E E E. Fig. 4 represents a section of Fig. 3 from F to G. Fig. 5 is another form of the accommodation double slide, composed of two loops, of metal or any proper substance, as shown by Fig. 6, which are connected at F by a pin, pivot, or other device, which allows them to move freely from the common center, F, and thus conform to any angle the rising of the suspender or brace may require.

From the foregoing it will be seen that my improved suspender or brace presents the following advantages, viz: first, the making of suspenders or braces of a single piece of webbing, leather, cloth, or other material, substantially as shown in Fig. 1, which can be crossed at the discretion of the wearer, and which, not being confined at any point, but passing freely through the button-strap loops B B at each side, will conform themselves to any shape or angle that convenience may require; second, that my suspender or brace, by passing freely through the loops B B, as above described, is self-adjusting, as the length can be regulated on both sides at one and the same time by drawing one end only of the suspender or brace through a slide, buckle, or other device, as shown at C C in Fig. 1; and, third, that by reason of the accommodation-slide, as shown at Figs. 3 and 5, or any other equivalent device, the two parts where they cross each other at the back can slide freely for self-adjustment, while at the same time they are held together.

I have described and shown a suspender consisting of a single strap or piece of webbing crossing on the back through an adjustable slide. It is manifest, however, that the slide will perform the same function if applied to a suspender consisting of two separate straps crossing on the back, or of two straps crossing on the back with the ends fastened together or to a common tag, as in the Cleveland combined shoulder-brace or suspender, or, in fact, when applied to any suspender crossing in a similar manner on the back of the wearer. I first applied an adjustable slide to the Cleveland combined shoulder-brace and suspender while I was interested in the manufacture thereof under said Cleveland patent, and considered it at the time a most valuable improvement. Hence, believing myself to be the first ever to apply an adjustable slide to a suspender of any kind at the crossing on the back, I consider that my invention consists, broadly, in combining with any form of suspender which crosses on the back an adjustable slide, through which the strap or straps shall cross, and by means of which the point of crossing may be readily changed or adjusted.

What I claim as my invention, and desire to secure by Letters Patent, as a new article of manufacture, is—

1. A suspender or brace substantially such as described, consisting of a single piece of webbing, leather, cloth, or other equivalent material passed through and sliding freely in two button-strap loops, and the two ends connected by a buckle or equivalent means, by which the length can be adjusted at pleasure, as and for the purpose described.

2. As a new article of manufacture, a suspender or brace consisting of a single piece of webbing or other equivalent material, constructed substantially as described, in combination with a slide to secure an adjustable crossing of the webbing or other material, substantially as described.

3. So combining an adjustable slide with a suspender crossing on the back of the wearer that the strap or straps shall cross in said slide, and so make the point of crossing adjustable, substantially as described.

Witness my hand, New York, 1869.

ALEX. W. HARRIS.

Witnesses:
W. G. WRIGHT,
JAS. HARRISON.